United States Patent [19]

Gotoh

[11] Patent Number: 4,724,993
[45] Date of Patent: Feb. 16, 1988

[54] LONGITUDINAL SEAM WELDING APPARATUS FOR USE IN SEAM WELDING MOTOR FRAME MAIN BODY JOINT

[75] Inventor: Tohru Gotoh, Nagoya, Japan

[73] Assignee: Mitsubishi Denki Kabushiki Kaisha, Japan

[21] Appl. No.: 927,557

[22] Filed: Nov. 6, 1986

[30] Foreign Application Priority Data

Nov. 8, 1985 [JP] Japan ............................. 60-250029

[51] Int. Cl.$^4$ ............................................. B23K 37/04
[52] U.S. Cl. ................................... 228/16; 228/17.5; 72/284
[58] Field of Search ............... 228/16, 17.5; 72/284; 29/157 T, 157.4

[56] References Cited

U.S. PATENT DOCUMENTS

| | | | |
|---|---|---|---|
| 54,643 | 5/1866 | Fieldhouse | 228/16 |
| 402,689 | 5/1889 | Simpson | 228/16 |
| 1,085,639 | 2/1914 | Snodgrass | 228/17.5 |
| 1,124,758 | 1/1915 | Lloyd | 228/17.5 |
| 3,779,064 | 12/1973 | Besson | 72/284 |
| 4,269,639 | 5/1981 | Lewis | 228/17.5 |
| 4,643,346 | 2/1987 | Gotoh | 228/155 |

FOREIGN PATENT DOCUMENTS

| | | | |
|---|---|---|---|
| 565960 | 12/1932 | Fed. Rep. of Germany | 228/16 |
| 880736 | 6/1953 | Fed. Rep. of Germany | 228/16 |
| 133142 | 10/1919 | United Kingdom | 228/16 |

Primary Examiner—Nicholas P. Godici
Assistant Examiner—Samuel M. Heinrich
Attorney, Agent, or Firm—Leydig, Voit & Mayer

[57] ABSTRACT

A longitudinal seam welding apparatus for welding a longitudinal joint of a cylindrical main body of an electric motor frame comprises, on a base, a rigid tubular welding jig including a guide for engaging the joint of the frame main body to be welded for longitudinally guiding the frame main body, a hydraulic pusher for passing the main frame body through the welding jig, and a welding torch for seam welding the longitudinal joint of the frame main body.

4 Claims, 10 Drawing Figures

FIG. 8
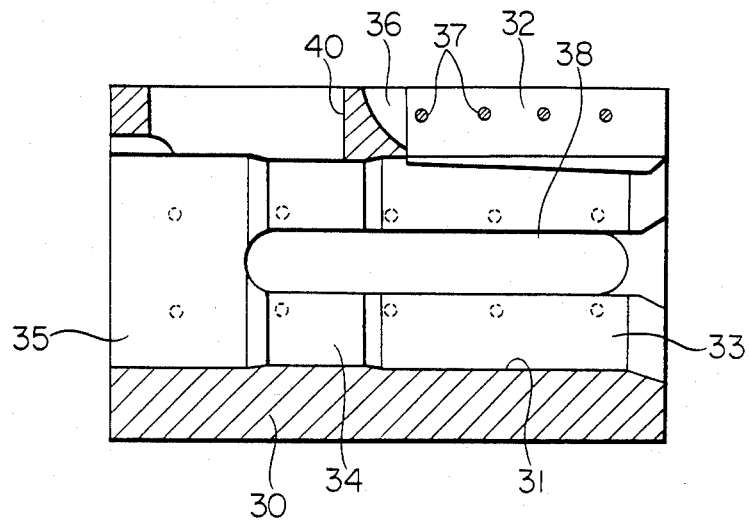
FIG.9(a)   FIG.9(b)
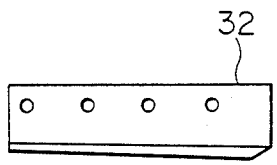 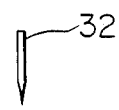

LONGITUDINAL SEAM WELDING APPARATUS FOR USE IN SEAM WELDING MOTOR FRAME MAIN BODY JOINT

BACKGROUND OF THE INVENTION

This invention relates to a longitudinal seam welding apparatus for use in seam welding a longitudinal joint of a cylindrical main body of an electric motor frame.

FIGS. 1 and 2 illustrate one example of a longitudinal seam welding apparatus which has heretofore been used in seam welding the joint of a cylindrical main body of an electric motor frame. The conventional seam welding apparatus comprises a pair of clampers 1 and 2 pivotally mounted on a bed 3 by a pin 4. The clampers 1 and 2 are movable between their open position and closed position (the closed position being shown in FIGS. 1 and 2) by the respective hydrualic cylinders 5 and 6. In the closed position, the clampers 1 and 2 firmly hold therebetween a frame main body 7 which is a wound steel sheet with its seam or joint 8 positioned at the top. The apparatus also comprises a centering pin 9 which extends downwardly from a column 10 so that the centering pin 9 may be inserted into the gap of the joint 8 of the frame main body 7. The apparatus comprises a welding torch 11 which is also supported by the column 10 for forming a weld seam along the longitudinal joint 8 of the frame main body 7.

In the conventional seam welding apparatus of the above construction, there are a number of parts that must be moved during the welding operation. Accordingly, the number of parts is relatively large and the structure of the welding apparatus is complex, rendering the apparatus expensive. Also, since the number of steps for achieving the seam welding is considerably great, a relatively long period of time is necessary for welding.

SUMMARY OF THE INVENTION

Accordingly, an object of the present invention is to provide a longitudinal seam welding apparatus for welding a longitudinal joint of a cylindrical main body of an electric motor frame in which the above discussed drawbacks of the welding apparatus are eliminated.

Another object of the present invention is to provide a longitudinal seam welding apparatus in which the number of parts is relatively small and the structure is simple.

Still another object of the present invention is to provide a longitudinal seam welding apparatus which is less expensive.

A further object of the present invention is to provide a longitudinal seam welding apparatus in which only a small number of steps is necessary and a relatively short period of time is necessary for longitudinal seam welding.

With the above objects in view, a longitudinal seam welding apparatus comprises, in order to weld a longitudinal joint of a cylindrical main body of an electric motor frame, a rigid tubular welding jig including a guide for engaging the joint of the frame main body to be welded for longitudinally guiding the frame main body, a pusher for passing the main frame body through the welding jig, and a welding torch for seam welding the joint of the frame main body.

In one preferred embodiment, a welding jig comprises a rigid tube having a bore extending therethrough with a first diameter in which the frame main body can be snugly and slidably inserted while maintaining a longitudinal gap of the joint of the frame main body and a second diameter in which the frame main body can be snugly and slidably inserted with said longitudinal gap of the joint being decreased to allow the formation of a weld therealong.

BRIEF DESCRIPTION OF THE DRAWINGS

The present invention will become more readily apparent from the following detailed description of the preferred embodiment of the present invention taken in conjunction with the accompanying drawings, in which:

FIG. 8 is a longitudinal sectional view of the welding jig tube taken along the line VIII—VIII of FIG. 6, and FIGS. 9a and 9b are detail views of the guide plate.

DETAILED DESCRIPTION OF THE PREFERRED EMBODIMENT

Figure 2:
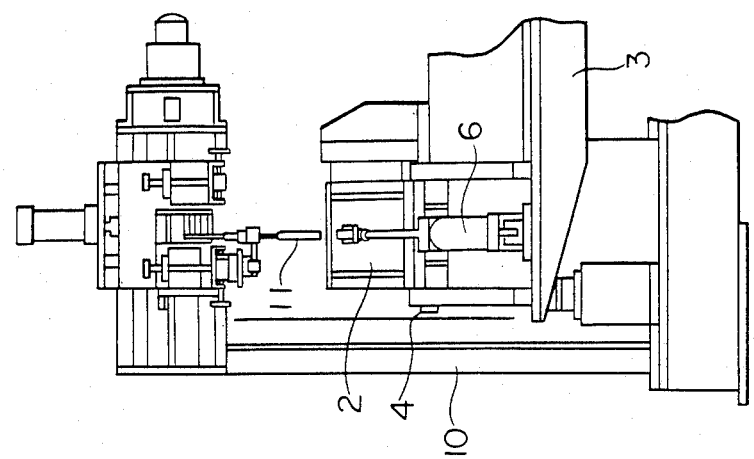
FIG. 2 is a side view of the conventional welding apparatus of FIG. 1.
Figure 1:
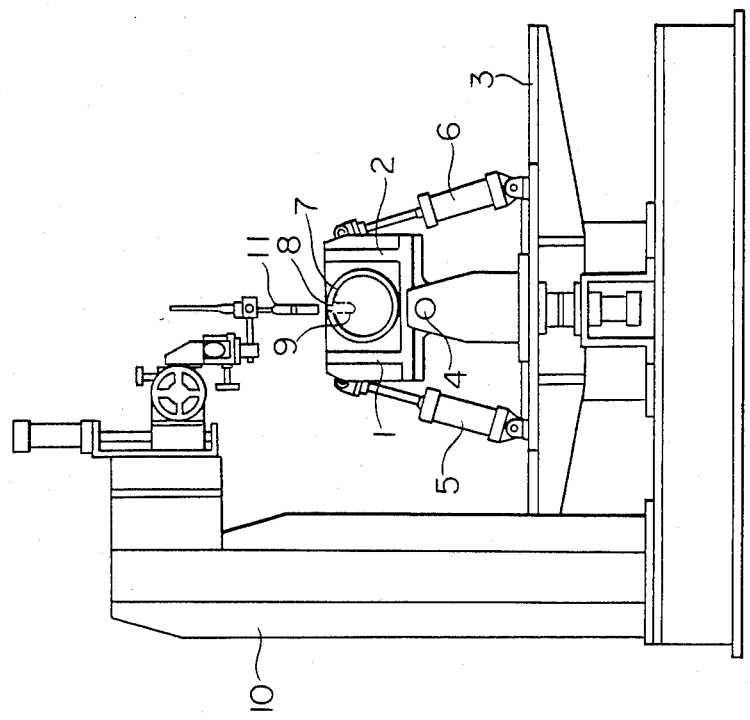
FIG. 1 is a front view of a conventional longitudinal seam welding apparatus.
Figure 3:
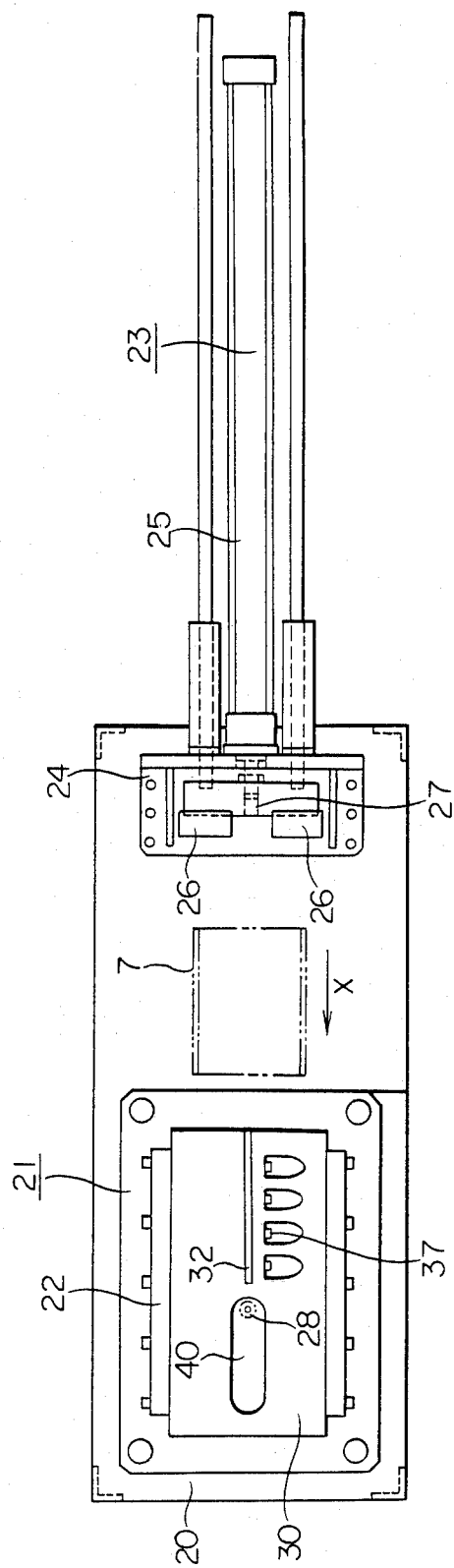
FIG. 3 is a plan view of a longitudinal seam welding apparatus of the present invention.
Figure 4:
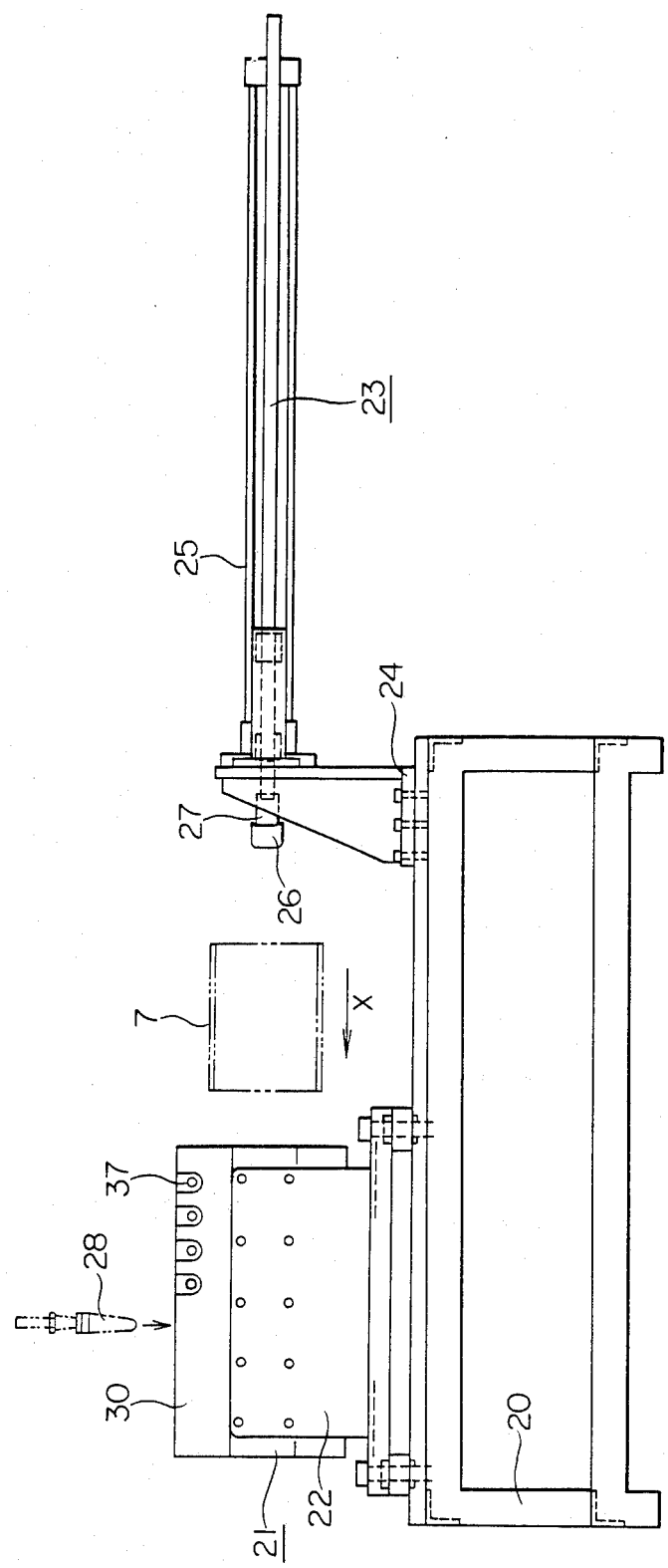
FIG. 4 is a side view of the welding apparatus shown in FIG. 3.
Figure 5:
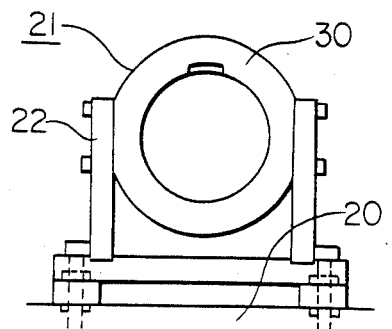
FIG. 5 is a front view showing the welding jig mounted to the welding apparatus.
Figure 6:
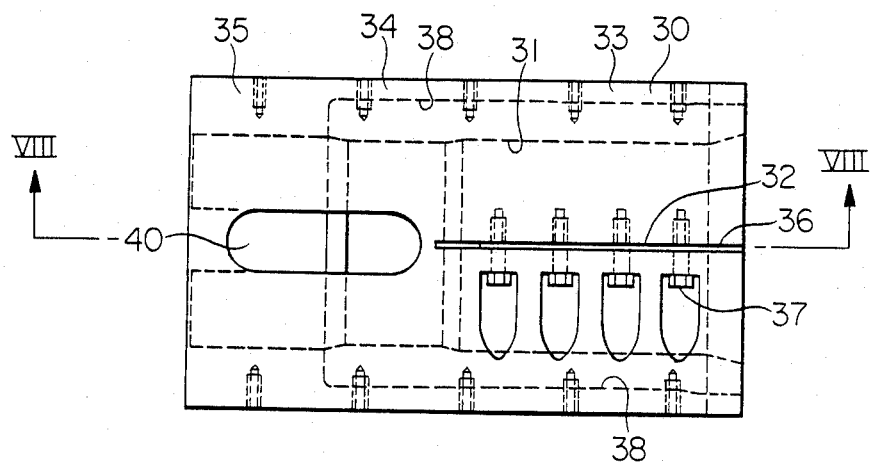
FIG. 6 is a plan view of the jig tube.
Figure 7:
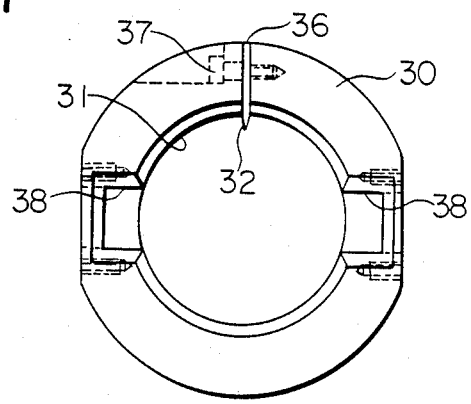
FIG. 7 is a view showing the end face of the welding jig tube.

Referring now to FIGS. 3 to 9 in which a longitudinal seam welding apparatus of the present invention is illustrated, the welding apparatus comprises a base 20 and a rigid tubular welding jig 21 mounted by a bracket 22 on the base 20. The welding apparatus also comprises a hydraulic pusher 23 mounted by a bracket 24 on the base 20 for passing the main frame body 7 through the welding jig 21. The pusher 23 comprises a hydraulic cylinder 25 secured to the mounting bracket 24 and push pads 26 connected to a plunger 27 of the hydraulic cylinder 25. A welding torch 28 for seam welding the joint of the frame main body 7 is also supported above the welding jig 21. Although not illustrated the welding torch 28 is supported by a suitable support means such as an upright arm similar to the column 10 illustrated in FIGS. 1 and 2.

The welding jig 21 comprises a substantially cylindrical rigid tube 30 having a cylindrical bore 31 extending therethrough, and a guide 32 in the form of a guide plate extending into the bore 31 of the tube 30 for engaging the joint 8 of the frame main body 7 for longitudinally guiding it. The bore 31 of the welding jig tube 30 includes a first section 33 of a first diameter, a second section 34 of a second diameter and a third section 35 of a third diameter. The first diameter of the first section 33 and the second diameter of the second section 34 are such that the frame main body 7 can be snugly and slidably inserted therein by the action of the hydraulic pusher 23. However, the first diameter is selected such that when the frame main body 7 is placed in the first bore section 33, the longitudinal joint 8 of the main body 7 remains apart leaving a small gap. The second diameter is selected such that when the frame main body 7 is in the second bore section 34, the joint 8 of the frame main body 7 is closed leaving substantially no gap therein in order to allow the seam welding along the joint to be carried out. Thus, the first diameter is slightly larger than the second diameter and the third bore section 35 has a diameter slightly larger than the second section 34.

The jig tube 30 has formed therein a longitudinal slit 36 extending substantially over the entire length of the first bore section 33. The slit 36 securely receives therein the guide plate 32, and the guide plate 32 is firmly held therein by bolts 37 threaded into the jig tube. As best seen from FIG. 7, the lower edge of the guide plate 32 projects radially inwardly into the bore 31 and into the gap defined in the longitudinal joint 8 of the frame main body 30. Therefore, when the frame main body 7 is pushed in the bore 31, the frame main body 7 is guided by the guide plate 32 so that the circumferential position of the joint 8 in the jig tube 30 is always kept at the central, uppermost position shown in FIGS. 3 and 4.

In order to allow the pusher pads 26 of the hydraulic pusher 23 to enter into the welding jig 21 and to continue pushing of the frame main body 7 even after it is placed within the bore 31 of the jig tube 30, a pair of axial grooves 38 are provided which extend from front end of the tube 30 to the rear end of the second bore section 34 as viewed in the direction of movement of the pusher pads 26.

The welding jig tube 30 also has formed therein a relatively large axially elongated opening 40. This opening 40 is located at the central uppermost position of the frame main body 7, but longitudinally extends to bridge between the second and the third bore sections 34 and 35. As the hydraulic pusher 23 pushes the frame main body 7 into the welding jig 21 and the leading edge of the frame main body 7 reaches this opening 40, the closed joint 8 of the main body 7 is exposed through the opening 40, enabling the exposed joint 8 to be welded by the welding torch 28 which is located above the elongated opening 40. Thus, the longitudinal joint 8 of the frame main body 7 can be continuously welded as the frame main body 7 progresses to the left in FIG. 4 until the trailing edge of the frame main body 7 passes the welding torch 28. As the frame main body 7 moves further, its trailing edge leaves the small diameter second bore section 34 and enters into the larger diameter third section 35 in which the frame main body 7 can be relatively easily moved, enabling the manual removal of the welded frame main body 7 from the welding jig 21.

In accordance with the longitudinal seam welding apparatus of the present invention, there are only a small number of parts that must be moved during the welding operation. Accordingly, the number of parts is relatively small and the structure of the welding apparatus is simple, rendering the apparatus comparatively inexpensive. Also, since only a few steps are required for achieving the seam welding, only a relatively short period of time is necessary therefor.

What is claimed is:

1. A longitudinal seam welding apparatus for welding a longitudinal joint of a cylindrical main body of an electric motor frame comprising:
   a base;
   a rigid tubular welding jig mounted on said base, said welding jig including a guide for engaging the joint of the frame main body to be welded for longitudinally guiding the frame main body, said welding jig comprising a rigid tube having a bore extending therethrough having a first diameter portion extending axially in which the frame main body can be snugly and slidably inserted with a longitudinal gap of the joint of the frame main body remaining open, a second diameter portion extending axially in which the frame main body can be snugly and slidably inserted with said longitudinal gap of the joint substantially closed to allow the formation of a weld therealong and a third diameter portion slightly larger in diameter than said second diameter;
   a pusher mounted on said base having elements for engaging an end of the frame main body and passing the main frame body through said welding jig;
   said welding jig rigid tube having axially extending means which projects laterally along said first and second diameter portions for receiving said pusher elements and allowing said elements to pass the frame main body longitudinally into the third diameter portion from which it may be easily removed; and
   a welding torch for seam welding the joint of the frame main body before it passes into the third diameter portion.

2. A welding apparatus as claimed in claim 1 wherein said guide comprises a guide plate projecting radially inward from the inner surface of the bore of said welding jig tube.

3. A welding apparatus as claimed in claim 1 wherein said welding jig has formed therein an opening for exposing the joint to be welded to said welding torch.

4. A welding apparatus as claimed in claim 1 wherein said pusher element receiving means is located along the circumference of said bore spaced from said guide.

* * * * *